(12) United States Patent
McClung

(10) Patent No.: US 7,556,067 B2
(45) Date of Patent: Jul. 7, 2009

(54) FUEL TANK FILLER NECK ASSEMBLY

(75) Inventor: Chad A. McClung, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 355 days.

(21) Appl. No.: 11/276,146

(22) Filed: Feb. 15, 2006

(65) Prior Publication Data

US 2006/0180241 A1 Aug. 17, 2006

Related U.S. Application Data

(60) Provisional application No. 60/653,833, filed on Feb. 17, 2005.

(51) Int. Cl.
*B65B 1/04* (2006.01)
*B65B 3/00* (2006.01)
*F16L 9/14* (2006.01)

(52) U.S. Cl. .............. 141/325; 220/86.2; 138/140; 138/141

(58) Field of Classification Search ............ 141/18, 141/301, 325, 348–350; 220/86.2; 138/137, 138/140, 141
See application file for complete search history.

(56) References Cited

U.S. PATENT DOCUMENTS

| | | | | |
|---|---|---|---|---|
| 5,373,870 A | * | 12/1994 | Derroire et al. | 138/125 |
| 5,568,828 A | * | 10/1996 | Harris | 141/348 |
| 5,958,532 A | * | 9/1999 | Krause et al. | 428/36.3 |
| 6,056,029 A | * | 5/2000 | Devall et al. | 141/383 |
| 6,170,535 B1 | * | 1/2001 | Sadr et al. | 138/137 |
| 6,502,607 B2 | * | 1/2003 | Brown et al. | 141/1 |
| 6,555,243 B2 | * | 4/2003 | Flepp et al. | 428/474.4 |
| 7,111,646 B2 | * | 9/2006 | Sato | 138/137 |
| 2002/0108669 A1 | | 8/2002 | Brown et al. | |

FOREIGN PATENT DOCUMENTS

DE 4405409 8/1995

OTHER PUBLICATIONS

European Search Report dated Oct. 23, 2007, European Application No. 06250846.

* cited by examiner

*Primary Examiner*—Timothy L Maust
(74) *Attorney, Agent, or Firm*—Barnes & Thornburg LLP

(57) ABSTRACT

A fuel tank filler neck apparatus includes a filler neck and a filler neck component mounted in a fuel-conducting passageway formed in the filler neck. The filler neck component could be a fuel tan inlet check valve or a closure cap mount.

19 Claims, 5 Drawing Sheets

FUEL TANK FILLER NECK ASSEMBLY

This application claims priority under 35 U.S.C. § 119(e) to U.S. Provisional Application Ser. No. 60/653,833, filed Feb. 17, 2005, which is expressly incorporated by reference herein.

BACKGROUND

The present disclosure relates to fuel systems, and particularly to fuel tank filler necks. More particularly, the present disclosure relates to a component coupled to a fuel tank filler neck and retained in a fuel-conducting passageway formed in the filler neck.

SUMMARY

In accordance with the present disclosure, a component such as an inlet cup or inlet check valve is retained in a fixed position in a filler neck by bonding a low-permeation layer of the component to a low-permeation layer of the filler neck. The layers are made of the same or similar materials.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying drawings in which.

DETAILED DESCRIPTION OF THE DRAWINGS

Figure 1:
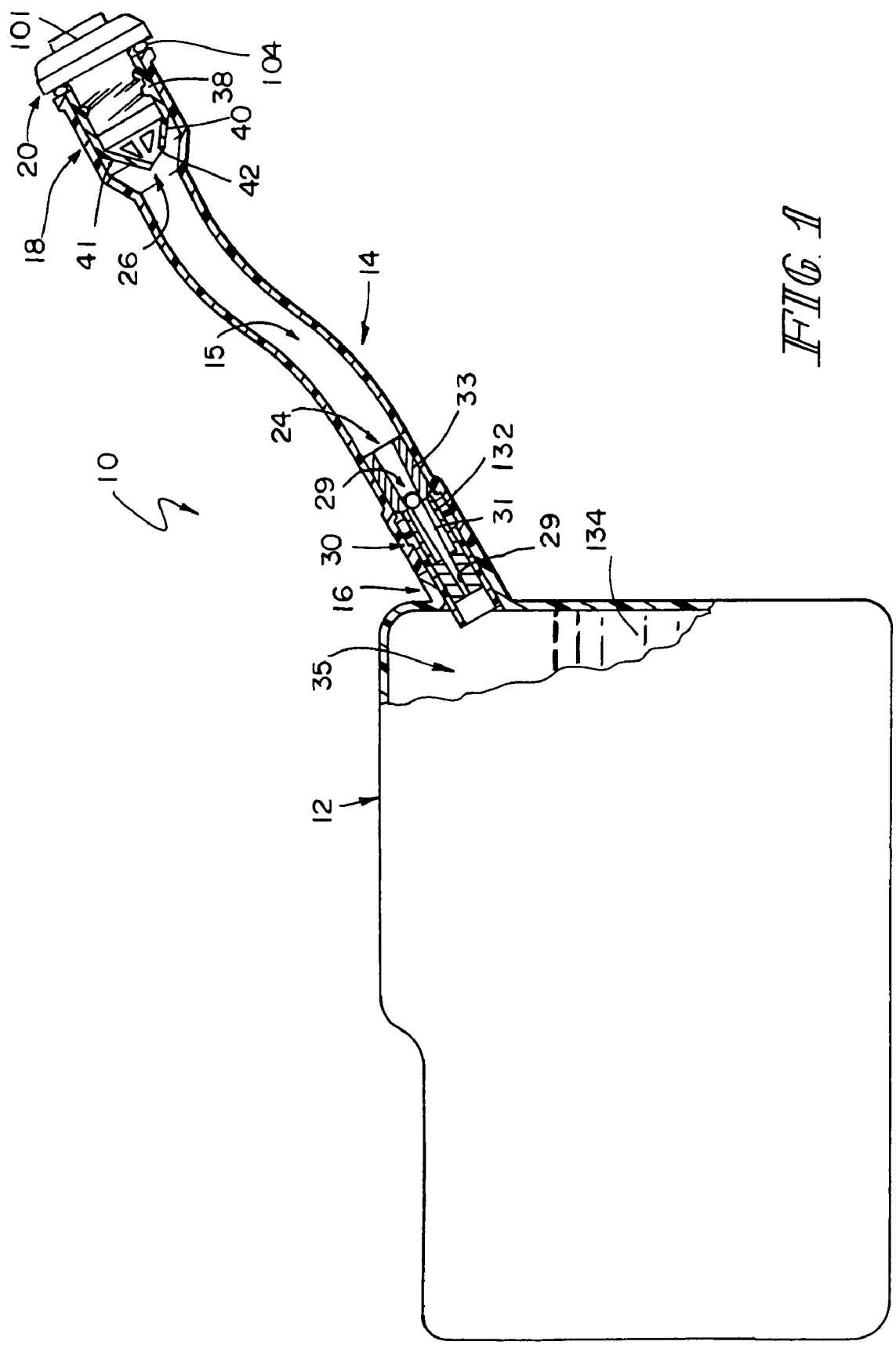
FIG. 1 is a perspective view of a fuel tank coupled to a tank filler neck including an inlet cup and closure cap at an outer end of the filler neck and an inlet check valve at an inner end of the filler neck in accordance with the present disclosure.

A vehicle fuel system 10 comprises a fuel tank 12, a filler neck 14 having a lower end 16 coupled to fuel tank 12 and an upper end 18, and a removable closure cap 20 coupled to upper end 18 of filler neck 14 to close an open mouth 22 formed in the upper end of filler neck 14 as shown, for example, in FIG. 1. Vehicle fuel system 10 also comprises filler neck components such as an inlet check valve 24 and an inlet cup 26 coupled to filler neck 14 as shown diagrammatically in FIG. 2.

Inlet check valve 24 is configured to lie in a fuel-conducting passageway 15 formed in filler neck 14 and regulate flow of liquid fuel and fuel vapor therethrough. In the illustrated embodiment, a fuel-conducting conduit 29 formed in inlet check valve 24 includes a "one-way" valve member 31 that is slidable in a fuel-conducting conduit 29 formed in a valve base 33 between conduit-closing position shown in FIG. 1 and a conduit-opening position (not shown). During refueling, liquid fuel discharged into an "open" filler neck 14 by a fuel-dispensing pump nozzle (not shown) contacts and moves one-way valve member 31 inwardly against a yieldable biasing spring 132 located in valve base 33 to assume the opened position so that liquid fuel can flow past the one-way valve member 31 and through fuel-conducting conduit 29 into a fuel reservoir 134 provided in an interior region 35 of fuel tank 12. Reference is made to U.S. Pat. No. 5,568,828 and application Ser.No. 10/810,982, filed Mar. 26, 2004, for disclosures relating to vehicle fuel systems and inlet check valves, which patent and application are hereby incorporated by reference herein.

Inlet cup 26 includes a mount 38 and a nozzle restrictor 40 coupled to mount 38 and formed to include an aperture 42 as shown, for example, in FIGS. 1 and 3-5. Mount 38 is coupled to outer end 18 of filler neck 14 and sized to receive an inner portion of closure cap 20 therein as suggested in FIGS. 1 and 5. Aperture 42 is sized to receive a fuel-dispensing portion of a pump nozzle (not shown) therein during tank refueling.

Figure 2:
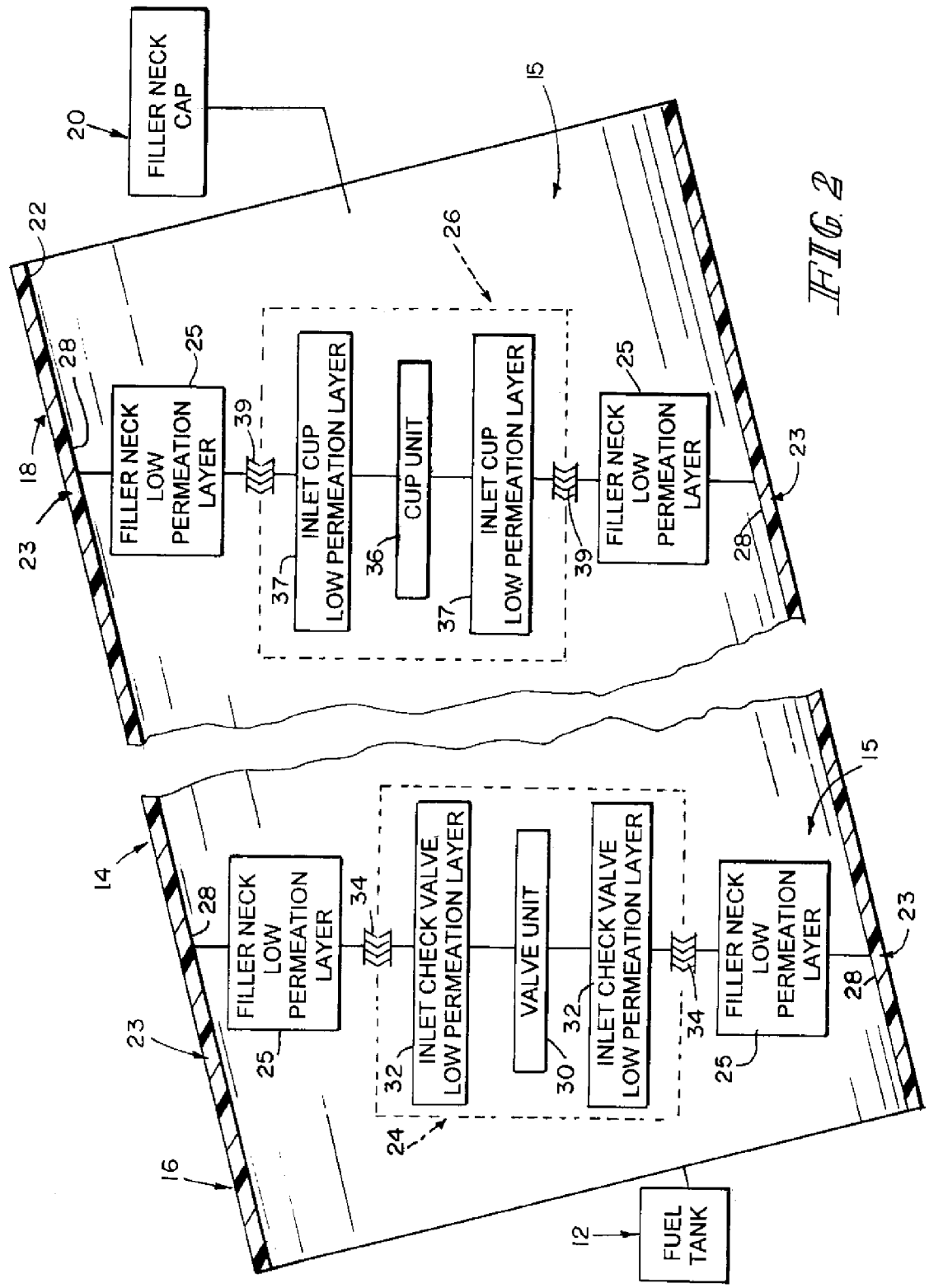
FIG. 2 is an enlarged diagrammatic view of the filler neck of FIG. 1 showing that (1) a low-permeation layer in the inlet check valve is bonded to a low-permeation layer in the filler neck to retain the inlet check valve in a fixed position in the filler neck and (2) a low-permeation layer in the inlet cup is bonded to a low-permeation layer in the filler neck to retain the inlet cup in a fixed position in the filler neck.

As suggested in FIG. 2, filler neck 14 comprises a side wall 23 and a filler neck low-permeation layer 25 coupled to an interior surface 28 of side wall 23. It is within the scope of the present disclosure to mate a low-permeation layer provided on an exterior portion of a filler neck component (e.g., inlet check valve 24 or inlet cup 26) with a low-permeation layer 25 provided on an interior surface 28 of filler neck 14.

As suggested diagrammatically in FIG. 2, inlet check valve 24 includes a valve unit 30 and an inlet check valve (component) low-permeation layer 32 coupled to filler neck low-permeation layer 25 at bond joint 34 to retain valve unit 30 in a fixed position in fuel-conducting passageway 15 of lower end 16 of filler neck 14. A "low-emission" union of filler neck 14 and inlet check valve 24 is established at bond joint 34 since low-permeation layers 25 and 32, in an illustrative embodiment, are made of substantially the same material and bonded to one another.

In an illustrative embodiment shown in FIG. 1, inlet check valve 24 is coupled to filler neck 14 by bonding inlet check valve low-permeation layer 32 on valve base 33 of valve unit 30 to filler neck low-permeation layer 25 on filler neck 14. Valve unit 30 comprises one-way valve member 31, spring 132, and valve base 33.

As suggested diagrammatically in FIG. 2, inlet cup 26 includes a cup unit 36 and an inlet cup (component) low-permeation layer 37 coupled to filler neck low-permeation layer 25 at bond joint 39 to retain cup unit 36 in a fixed position in fuel-conducting passageway 15 of upper end 18 of filler neck 14. A low-emission union of filler neck 14 and inlet cup 26 is established at bond joint 39 since low-permeation layers 25 and 37, in an illustrative embodiment, are made of the same material and bonded to one another.

Figure 3:
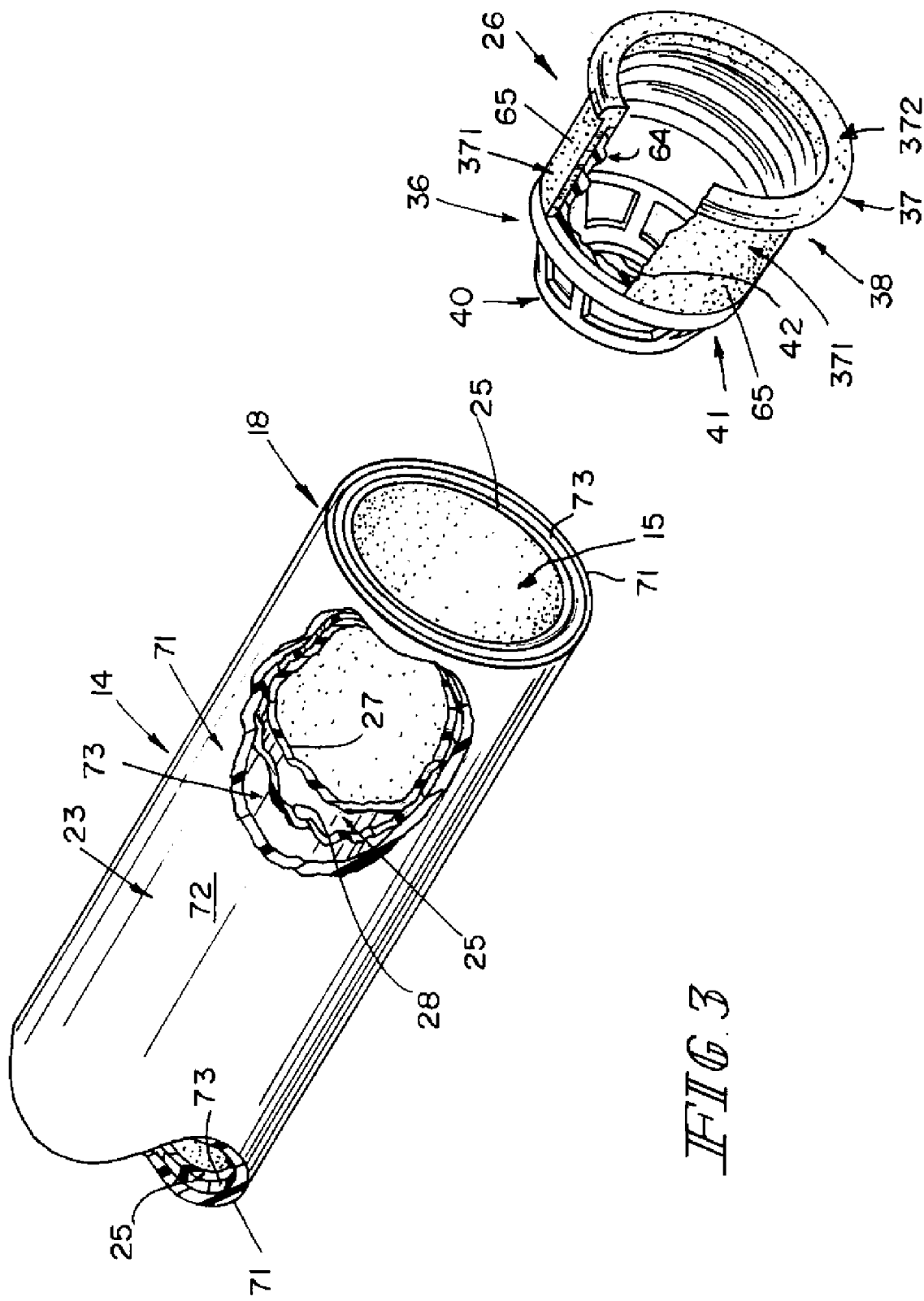
FIG. 3 is a perspective assembly view, with portions broken away, showing various layers included in the filler neck and various layers included in the inlet cup before the inlet cup is bonded to the filler neck.
Figure 4:
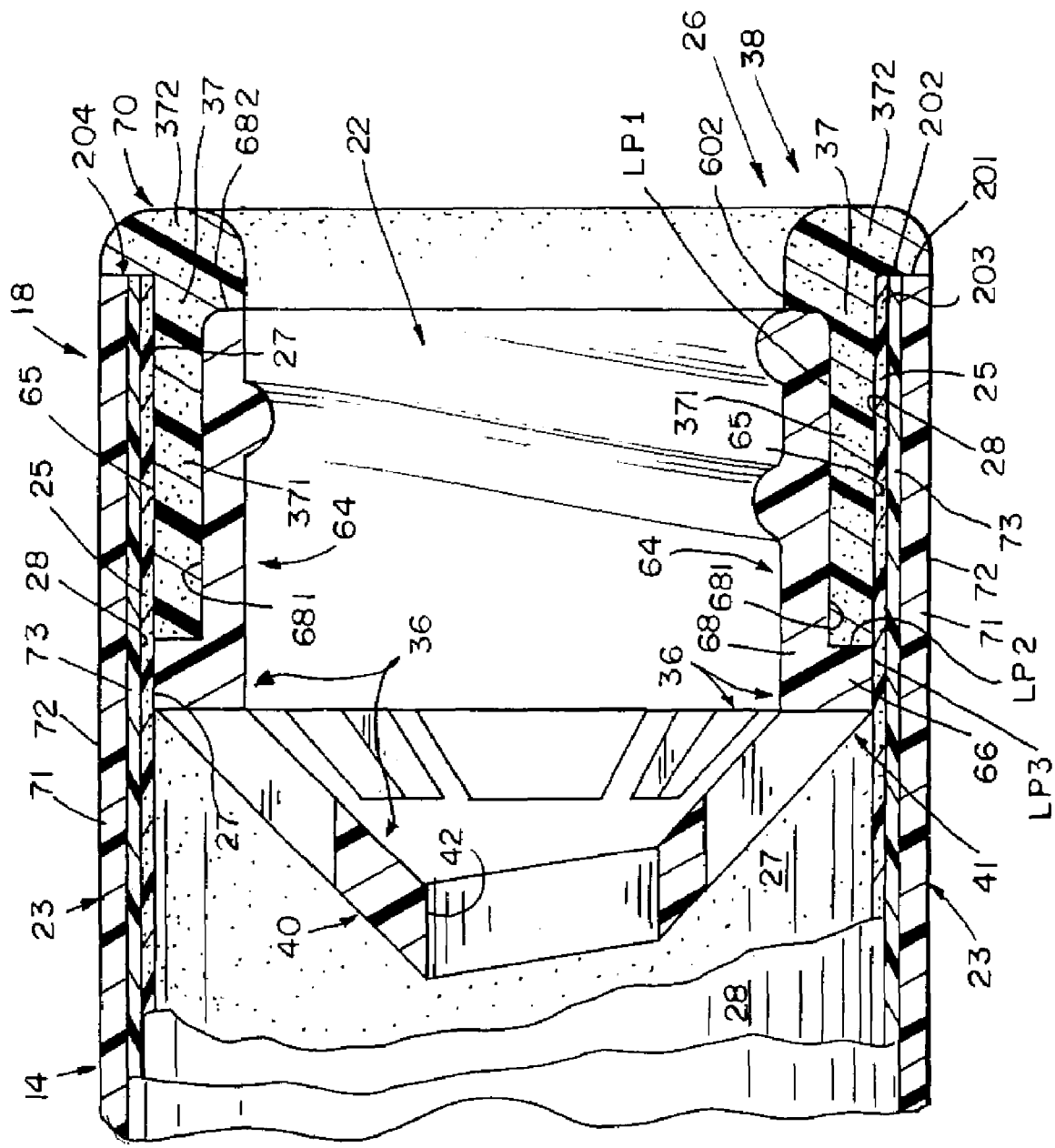
FIG. 4 is an enlarged sectional view showing mating and bonding of the inlet cup low-permeation layer and the filler neck low-permeation layer before a closure cap is coupled to the filler neck to close an open mouth of the filler neck.
Figure 5:
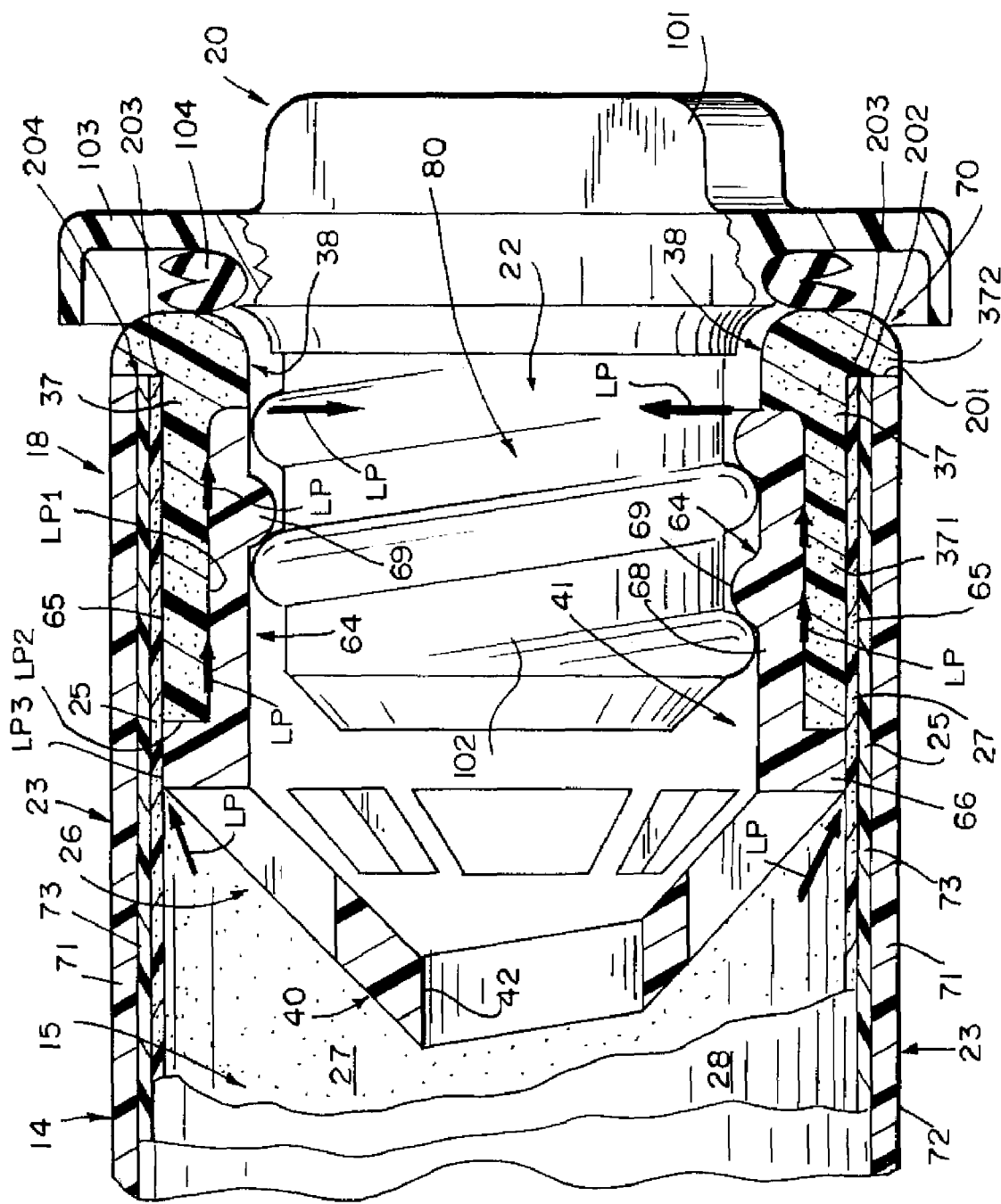
FIG. 5 is a view similar to FIG. 4 showing a closure cap coupled to the filler neck to define a closed chamber in the filler neck and showing that a "leak path" (LP), which leak path may be established between dissimilar materials comprising the inlet cup, both originates and terminates in the closed chamber to block discharge of liquid fuel and fuel vapor leakage to the surroundings outside the filler neck while the closure cap is mounted on the filler neck.

In an illustrative embodiment shown in FIGS. 3-5, inlet cup 26 is coupled to filler neck 14 by bonding inlet cup low-permeation layer 37 on cup unit 36 to filler neck low-permeation layer 25 on filler neck 14. Cup unit 36 comprises nozzle restrictor 40, threaded restrictor anchor 64, and inlet cup low-permeation layer 37, as shown best in FIG. 4. Nozzle restrictor 40 and threaded restrictor anchor 64 cooperate to define a base 41 to which inlet cup low-permeation layer 25 is coupled.

In an illustrative embodiment, each of low-permeation layers 25, 32, and 37 is made of polyarylamide (PAA). It is within the scope of this disclosure to use other suitable materials to form layers 25, 32, and 37 such as, for example, semiaromatic polyamide (PPA), polyphenylene sulfide alloy (PPS), and polybutylene terephthalate (PBT).

As suggested in FIGS. 3 and 4, filler neck 14 comprises a side wall 23 including an outer sleeve 71 providing an exterior surface 72 and an inner sleeve 73 providing interior surface 28. Outer sleeve 71 surrounds inner sleeve 73 and cooperates with inner sleeve 73 to define side wall 23. Filler neck low-permeation layer 25 of inlet cup 26 is appended to interior surface 28 of inner sleeve 73 as shown best in FIG. 4. Each of outer and inner sleeves 71, 73 is made of a suitable plastics material in the illustrated embodiment. Thus, filler neck 14 is a multi-layer tubular member.

As suggested in FIGS. 3 and 4, mount 38 of inlet cup 26 includes threaded restrictor anchor 64 and inlet cup low-permeation layer 37. Restrictor anchor 64 includes a restrictor support ring 66 and a cap-mount sleeve 68.

Restrictor support ring 66 is coupled to nozzle restrictor 40 and to an interior surface 27 of filler neck low-permeation layer 25. Nozzle restrictor 40 is formed to include aperture means 42 for receiving a small-diameter unleaded fuel-dispensing pump nozzle therein so that unleaded fuel can be dispensed into fuel-conducting passageway 15.

Cap-mount sleeve 68 is coupled to restrictor support ring 66 and arranged to lie inside an interior region 15 defined by filler neck low-permeation layer 25 to define an annular space therebetween. Inlet cup low-permeation layer 37 includes a cylindrical inner section 371 located in that annular space and a cylindrical outer section 372 located outside that annular space and formed to define an annular rim 70 as suggested in FIG. 4. Bond joint 39 is established between interior surface 27 of filler neck low-permeation layer 25 and an exterior surface 65 of cylindrical inner section 371 of inlet cup low-permeation layer 37.

By bonding low-permeation layer 37 of inlet cup 26 to low-permeation layer 25 of filler neck 14 without using mechanical locks or clamps or additional sealing members, those layers 25, 37 are unified to produce a monolithic element providing a liquid-and-vapor barrier to block leakage of liquid fuel and fuel vapor (or other hydrocarbon emissions) along a path between layers 25, 37. It is thus unnecessary to deploy any O-ring seal or gasket between layers 25, 37 to minimize discharge of emissions from the filler neck to the surroundings along or across a joint or space between a filler neck and an inlet cup mounted in the filler neck. In the present disclosure, the barrier or low-permeation layers 25, 37 of filler neck 14 and inlet cup 26 are made of the same (or similar) material and are bonded to one another to form a low-emission union therebetween. In illustrative embodiments, such a bonded joint can be achieved through a welding operation (e.g., hot plate, sonic, spin, vibration, or laser) or by overmolding (e.g., blow molding).

As suggested in FIG. 5, once closure cap 20 is mounted on the filler neck, any liquid fuel and fuel vapor that might happen to flow along a leak path (LP) between restrictor anchor 64 and low-permeation layer 37 does not escape to the surroundings and is discharged back into a closed chamber 80 provided in fuel-conducting passageway 15. Closure cap 20 includes a handgrip 101, a threaded portion 102 configured to mate with and engage threads 69 formed on cap-mount sleeve 68, an annular flange 103, and an annular seal 104 coupled to annular flange 103 and arranged to be compressed between rim 70 on filler neck 14 and annular flange 103 on closure cap 20 to establish a sealed interface between filler neck 14 and closure cap 20.

A filler neck 14 comprises a side wall 23 and a filler neck low-permeation layer 25 coupled to an interior surface 28 of side wall 23 and configured to define a boundary of a fuel-conducting passageway 15 extending through filler neck 14 as suggested in FIG. 2. A filler neck component (e.g., inlet check valve 24 or inlet cup 26) comprises a base 33 arranged to lie in fuel-conducting passageway 15 and a component low-permeation layer 32 or 37 coupled to an exterior surface of the base 33. Filler neck low-permeation layer 25 is made of a first material and component low-permeation layer 32, 37 is also made of the first material. Component low-permeation layer 32, 37 is bonded to filler neck low-permeation layer 25 at a bond joint 34, 39 to retain the filler neck component 24, 26 in a fixed position in fuel-conducting passageway 15 to establish a low-emission union of component and filler neck low-permeation layers 25, 32, 37 to provide means for blocking permeation of liquid fuel and fuel vapor extant in fuel-conducting passageway 15 to atmosphere surrounding side wall 23 through component and filler neck low-permeation layers 25, 32, 37.

In an embodiment shown diagrammatically in FIG. 2 and illustratively in FIG. 1, the filler neck component comprises a base 33 formed to include fuel-conducting conduit 29, a biasing spring 132, and a one-way valve member 31 that cooperate with base 33 to define a fuel tank inlet check valve 24 located in a lower end 16 of filler neck 14 to lie in close proximity to a fuel tank 12 associated with filler neck 14. One-way valve member 31 is mounted for sliding movement in a fuel-conducting conduit 29 formed in base 33 and urged to a conduit-closing position by biasing spring 132. Spring 132 is configured to yield to allow movement of one-way valve member 31 relative to base 33 to assume a conduit-opening passageway 15 defined by filler neck low-permeation layer 25 into and through fuel-conducting conduit 29 formed in base 33 in response to a force applied to one-way valve member 31 by the incoming liquid fuel flowing toward fuel tank 12 associated with filler neck 14.

In another embodiment shown diagrammatically in FIGS. 2 and illustratively in FIGS. 1 and 3-5, filler neck component comprises a base 41, a closure cap 20 configured to mate with base 41 to close an opening into fuel-conducting passageway 15 defined by filler neck low-permeation layer 25. Closure cap 20 includes an annular seal 104 arranged to mate with a portion of component low-emission layer 37 coupled to an exterior surface of base 41 and a cap body 102, 103 configured to carry annular seal 104 and engage base 41 to establish a sealed connection between cap body 102, 103, annular seal 104, and component low-emission layer 37 to block discharge of liquid fuel and fuel vapor from fuel-conducting passageway 15 through a space between closure cap 20 and component low-emission layer 25. Base 41 cooperates with filler neck low-emission layer 25 to define a leak-path conduit (LP) therebetween that originates and terminates in fuel-conducting passageway 15 (as suggested in FIG. 5) so that any liquid fuel and fuel vapor that flows in the leak-path conduit (LP) is emptied into fuel-conducting passageway 15 and is unable to escape to the atmosphere surrounding filler neck 14.

Base 41 includes a nozzle restrictor 40 formed to include a nozzle-receiving aperture 42 sized and adapted to receive a small-diameter unleaded fuel-dispensing pump nozzle and a restrictor anchor 64 coupled to nozzle restrictor 40 to locate nozzle-receiving aperture 42 in fuel-conducting passageway 15. Component low-permeation layer 37 is coupled to an exterior surface of restrictor anchor 64 to cause a first portion (LP1) of the leak-path conduit (LP) to lie therebetween as suggested in FIGS. 4 and 5.

Restrictor anchor 64 includes a cap-mount sleeve 68 including an interior surface configured to receive and mate with cap body 102, 103 of closure cap 20 and an exterior surface coupled to component low-permeation layer 37 to define first portion (LP1) of leak-path conduit (LP) therebetween. Restrictor anchor 64 further includes a restrictor support ring 66 interposed between and coupled to each of nozzle restrictor 40 and cap-mount sleeve 68. Restrictor support ring 66 includes a first exterior surface coupled to filler neck low-permeation layer 25 to define a second portion (LP2) of leak-path conduit (LP) therebetween and a second exterior surface coupled to component low-permeation layer 25 to define a third portion (LP3) of leak-path conduit (LP) therebetween. Second portion (LP2) interconnects the first and third portions (LP1, LP3) in fluid communication. Each of first and third portions (LP1, LP3) are arranged to lie in fluid communication with fuel-conducting passageway 15 to cause leak-path conduit (LP) to originate and terminate in fuel-conducting passageway 15 as suggested in FIGS. 4 and 5.

As suggested in FIGS. 4 and 5, each of side wall 23 of filler neck 14 and filler neck low-permeation layer 25 terminate, respectively, at axially outer ends 201, 202, 203 thereof and cooperate to define an annular outer end face 204 of filler neck 14. Component low-permeation layer 37 includes an annular inner section 371 positioned to lie between portions of base 41 and filler neck low-permeation layer 25 and bonded to filler neck low-permeation layer 25 at bond joint 39. Component low-permeation layer 25 further includes an annular outer section 372 appended to annular inner section 371 and mated to annular outer end face 204 of filler neck 14. Annular outer section 372 of component low-permeation layer 25 is bonded to axially outer end 203 of filler neck low-permeation layer 25 at bond joint 39.

Base 41 includes an exterior annular side surface 681 coupled to annular inner section 371 of component low-permeation layer 37 to cause one leg of first portion (LP1) of leak-path conduit (LP) to lie therebetween as shown in FIGS. 4 and 5. Base 41 further includes an exterior annular end surface 682 coupled to annular outer section 372 of component low-permeation layer 37 to cause a second leg of first portion (LP1) of leak-path conduit (LP) to lie therebetween. The second leg is arranged to lie in fluid communication with fuel-conducting passageway 15 as shown in FIGS. 4 and 5.

Restrictor anchor 64 is coupled to nozzle restrictor 40 and configured to include the exterior annular side and end surfaces 681, 682. Restrictor anchor 64 is also coupled to filler neck low-permeation layer 25 to cause second portion (LP2) of leak-path conduit (LP) to lie therebetween as shown in FIGS. 4 and 5.

The invention claimed is:

1. A fuel tank filler neck apparatus comprising
   a filler neck comprising a side wall and a filler neck low-permeation layer coupled to an interior surface of the side wall and configured to define a boundary of a fuel-conducting passageway extending through the filler neck, and
   a filler neck component comprising a base arranged to lie in the fuel-conducting passageway and a component low-permeation layer coupled to an exterior surface of the base, wherein the filler neck low-permeation layer is made of a first material, the component low-permeation layer is also made of the first material, and the component low-permeation layer is bonded to the filler neck low-permeation layer at a bond joint to retain the filler neck component in a fixed position in the fuel-conducting passageway to establish a low-emission union of the component and filler neck low-permeation layers to provide means for blocking permeation of liquid fuel and fuel vapor extant in the fuel-conducting passageway to atmosphere surrounding the side wall through the component and filler neck low-permeation layers.

2. The apparatus of claim 1, wherein the filler neck component further comprises a biasing spring and a one-way valve member that cooperate with the base to define a fuel tank inlet check valve located in a lower end of the filler neck to lie in close proximity to a fuel tank associated with the filler neck, the one-way valve member is mounted for sliding movement in a fuel-conducting conduit formed in the base and urged to a conduit-closing position by the biasing spring, and the spring is configured to yield to allow movement of the one-way valve member relative to the base to assume a conduit-opening position allowing flow of incoming liquid fuel to pass from the fuel-conducting passageway defined by the filler neck low-permeation layer into and through the fuel-conducting conduit formed in the base in response to a force applied to the one-way valve member by the incoming liquid fuel flowing toward the fuel tank associated with the filler neck.

3. A fuel tank filler neck apparatus comprising
   a filler neck comprising a side wall and a filler neck low-permeation layer coupled to an interior surface of the side wall and configured to define a boundary of a fuel-conducting passageway extending through the filler neck, and
   a filler neck component comprising a base arranged to lie in the fuel-conducting passageway and a component low-permeation layer coupled to an exterior surface of the base, wherein the filler neck low-permeation layer is made of a first material, the component low-permeation layer is also made of the first material, and the component low-permeation layer is bonded to the filler neck low-permeation layer at a bond joint to retain the filler neck component in a fixed position in the fuel-conducting passageway to establish a low-emission union of the component and filler neck low-permeation layers to provide means for blocking permeation of liquid fuel and fuel vapor extant in the fuel-conducting passageway to atmosphere surrounding the side wall through the component and filler neck low-permeation layers
   wherein the filler neck component further comprises a closure cap configured to mate with and close an opening into the fuel-conducting passageway defined by the filler neck low-permeation layer, wherein the closure cap includes an annular seal arranged to mate with a portion of the component low-emission layer coupled to an exterior surface of the base and a cap body configured to carry the annular seal and engage the base to establish a sealed connection between the cap body, annular seal, and the component low-emission layer to block discharge of liquid fuel and fuel vapor from the fuel-conducting passageway through a space between the closure cap and the component low-emission layer, and wherein the base cooperates with the filler neck low-emission layer to define a leak-path conduit therebetween that originates and terminates in the fuel-conducting passageway so that any liquid fuel and fuel vapor that flows in the leak-path conduit is emptied into the fuel-conducting passageway and is unable to escape to the atmosphere surrounding the filler neck.

4. The apparatus of claim 3, wherein the base includes a nozzle restrictor formed to include a nozzle-receiving aperture sized and adapted to receive a small-diameter unleaded fuel-dispensing pump nozzle and a restrictor anchor coupled to the nozzle restrictor to locate the nozzle-receiving aperture in the fuel-conducting passageway and wherein the component low-permeation layer is coupled to an exterior surface of the restrictor anchor to cause a first portion of the leak-path conduit to lie therebetween.

5. The apparatus of claim 4, wherein the restrictor anchor includes a cap-mount sleeve including an interior surface configured to receive and mate with the cap body of the closure cap and an exterior surface coupled to the component low-permeation layer to define the first portion of the leak-path conduit therebetween, the restrictor anchor further includes a restrictor support ring interposed between and coupled to each of the nozzle restrictor and the cap-mount body, the restrictor support ring includes a first exterior surface coupled to the filler neck low-permeation layer to define a second portion of the leak-path conduit therebetween and a second exterior surface coupled to the component low-permeation layer to define a third portion of the leak-path conduit therebetween, the second portion interconnects the first and third portions in fluid communication, and each of the first and third portions are arranged to lie in fluid communication with the fuel-conducting passageway to cause the leak-path conduit to originate and terminate in the fuel-conducting passageway.

6. The apparatus of claim 3, wherein each of the side wall of the filler neck and the filler neck low-permeation layer terminate at axially outer ends thereof and cooperate to define an annular outer end face of the filler neck, the component low-permeation layer includes an annular inner section positioned to lie between portions of the base and the filler neck low-permeation layer and bonded to the filler neck low-permeation layer at the bond joint, and the component low-permeation layer further includes an annular outer section appended to the annular inner section and mated to the annular outer end face of the filler neck.

7. The apparatus of claim 6, wherein the annular outer section of the component low-permeation layer is bonded to the axially outer end of the filler neck low-permeation layer at the bond joint.

8. The apparatus of claim 6, wherein the base includes an exterior annular side surface coupled to the annular inner section of the component low-permeation layer to cause one leg of a first portion of the leak-path conduit to lie therebetween, the base further includes an exterior annular end surface coupled to the annular outer section of the component low-permeation layer to cause a second leg of the first portion of the leak-path conduit to lie therebetween, and the second leg is arranged to lie in fluid communication with the fuel-conducting passageway.

9. The apparatus of claim 8, wherein the base includes a nozzle restrictor formed to include a nozzle-receiving aperture sized and adapted to receive a small-diameter unleaded fuel-dispensing pump nozzle and a restrictor anchor coupled to the nozzle restrictor and configured to include the exterior annular side and end surfaces, the restrictor anchor is also coupled to the filler neck low-permeation layer to cause a second portion of the leak-path conduit to lie therebetween, and the second portion is arranged to lie in fluid communication with the fuel-conducting passageway.

10. The apparatus of claim 3, wherein the side wall of the filler neck includes an inner sleeve providing an interior surface and an outer sleeve surrounding the inner sleeve and providing an exterior surface and the interior surface of the inner sleeve is coupled to the filler neck low-permeation layer.

11. The apparatus of claim 10, wherein each of the inner and outer sleeves and the filler neck low-permeation layer terminate at axially outer ends thereof and cooperate to define an annular outer end of the filler neck and the component low-permeation layer is mated to the annular outer end of the filler neck.

12. The apparatus of claim 11, wherein the component low-permeation layer includes an annular inner section positioned to lie between portions of the base and the filler neck low-permeation layer and bonded to the filler neck low-permeation layer at the bond joint and an annular outer section appended to the annular inner section and bonded to the axially outer end of the filler neck low-permeation layer at the bond joint.

13. The apparatus of claim 3, further comprising a second filler neck component comprising a second base arranged to lie in the fuel-conducting passageway and a component low-permeation layer coupled to an exterior surface of the second base, made of the first material, and bonded to the filler neck low-permeation layer at a second bond joint to retain the second filler neck component in a fixed position in the fuel-conducting passageway to establish a low-emission union of the component low-permeation layer of the second filler neck component and the filler neck low-permeation layer to provide means for blocking permeation of liquid fuel and fuel vapor extant in the fuel-conducting passageway to atmosphere surrounding the side wall through the component low-permeation layer of the second filler neck component and the filler neck low-permeation layer.

14. The apparatus of claim 13, wherein the second filler neck component further comprises a biasing spring and a one-way valve member that cooperate with the second base to define a fuel tank inlet check valve located in a lower end of the filler neck to lie in close proximity to a fuel tank associated with the filler neck, the one-way valve member is mounted for sliding movement in a fuel-conducting conduit formed in the second base and urged to a conduit-closing position by the biasing spring, and the spring is configured to yield to allow movement of the one-way valve member relative to the second base to assume a conduit-opening position allowing flow of incoming liquid fuel to pass from the fuel-conducting passageway defined by the filler neck low-permeation layer into and through the fuel-conducting conduit formed in the second base in response to a force applied to the one-way valve member by the incoming liquid fuel flowing toward the fuel tank associated with the filler neck.

15. A fuel tank filler neck apparatus comprising
a filler neck component formed to include a fuel-conducting conduit,
an annular component low-permeation layer coupled to and arranged to surround an annular exterior surface of the filler neck component,
an annular filler neck low-permeation layer arranged to surround the annular component low-permeation layer and bonded to the component low-permeation layer at a bond joint to establish a low-emission union of the component and filler neck low-permeation layers to provide means for blocking permeation of liquid fuel and fuel vapor extant in a fuel-conducting passageway formed in the annular component low-permeation layer to atmosphere surrounding the filler neck low-permeation layer, and an annular side wall coupled to and arranged to surround the annular filler neck low-permeation layer to form a filler neck containing the filler neck component.

16. The apparatus of claim 15, wherein each of the component and filler neck low-permeation layer is made of a first material and the annular side wall is made of a second material.

17. The apparatus of claim 15, wherein the filler neck component further comprises a biasing spring and a one-way valve member that cooperate with a base of the component to define a fuel tank inlet check valve located in a lower end of the filler neck to lie in close proximity to a fuel tank associated with the filler neck, the one-way valve member is mounted for sliding movement in a fuel-conducting conduit formed in the base and urged to a conduit-closing position by the biasing spring, and the spring is configured to yield to allow movement of the one-way valve member relative to the base to assume a conduit-opening position allowing flow of incoming liquid fuel to pass from the fuel-conducting passageway defined by the filler neck low-permeation layer into and through the fuel-conducting conduit formed in the base in response to a force applied to the one-way valve member by the incoming liquid fuel flowing toward the fuel tank associated with the filler neck.

18. A fuel tank filler neck apparatus comprising
a filler neck component formed to include a fuel-conducting conduit,
an annular component low-permeation layer coupled to and arranged to surround an annular exterior surface of the filler neck component,
an annular filler neck low-permeation layer arranged to surround the annular component low-permeation layer and bonded to the component low-permeation layer at a bond joint to establish a low-emission union of the component and filler neck low-permeation layers to provide means for blocking permeation of liquid fuel and fuel vapor extant in a fuel-conducting passageway formed in the annular component low-permeation layer to atmosphere surrounding the filler neck low-permeation layer, and
an annular side wall coupled to and arranged to surround the annular filler neck low-permeation layer to form a filler neck containing the filler neck component
wherein the filler neck component further comprises a closure cap configured to mate with and close an opening into the fuel-conducting passageway defined by the filler neck low-permeation layer, wherein the closure cap includes an annular seal arranged to mate with a portion of the component low-emission layer coupled to an exterior surface of a base and a cap body configured to carry the annular seal and engage the base to establish a sealed connection between the cap body, annular seal, and the component low-emission layer to block discharge of liquid fuel and fuel vapor from the fuel-conducting passageway through a space between the closure cap and the component low-emission layer, and wherein the base cooperates with the filler neck low-emission layer to define a leak-path conduit therebetween that originates and terminates in the fuel-conducting passageway so that any liquid fuel and fuel vapor that flows in the leak-path conduit is emptied into the fuel-conducting passageway and is unable to escape to the atmosphere surrounding the filler neck.

19. The apparatus of claim 18, wherein the base includes a nozzle restrictor formed to include a nozzle-receiving aperture sized and adapted to receive a small-diameter unleaded fuel-dispensing pump nozzle and a restrictor anchor coupled to the nozzle restrictor to locate the nozzle-receiving aperture in the fuel-conducting passageway and wherein the component low-permeation layer is coupled to an exterior surface of the restrictor anchor to cause a first portion of the leak-path conduit to lie therebetween.

* * * * *